Patented Feb. 9, 1932

1,844,431

UNITED STATES PATENT OFFICE

BORIS N. LOUGOVOY, OF MONTCLAIR, NEW JERSEY, ASSIGNOR TO ELLIS-FOSTER COMPANY, OF MONTCLAIR, NEW JERSEY, A CORPORATION OF NEW JERSEY

ENOLIC ACETONE DERIVATIVES AND PROCESS OF MAKING SAME

No Drawing. Application filed May 27, 1926. Serial No. 112,175.

This invention relates to enolic acetone derivatives and to the process of making same, and relates especially to the treatment of acetone for the purpose of increasing the enolization of said acetone, whereby greater yields of higher boiling point derivatives such as diacetone alcohol and other compounds may be obtained and in less time than normally would be possible.

Acetone may occur both as normal or ketonic acetone and as iso acetone or enolic acetone. Enolic acetone has a structure corresponding to that of the unsaturated alcohol, hydroxy propylene. Normal or ketonic acetone may exist in equilibrium with iso or enolic acetone.

Enolization apparently plays an important part in the condensation of acetone to form diacetone alcohol and other higher boiling acetone derivatives. My work has shown that when acetone is treated with small amounts of an alkali, such as a few hundredths of one percent of potassium hydroxide, to form higher boiling derivatives thereof, that under most advantageous conditions about one-eighth of its volume of diacetone alcohol will be formed, with the simultaneous formation of about one-eighth of its volume of a series of products boiling between 60° C., and 150° C. This is described in my copending application Ser. No. 96,053, filed March 19, 1926, of which the present case is in part a continuation. Thus in one treatment of acetone an equilibrium is reached in which not more than about one-fourth of the acetone will undergo condensation, about three-fourths remaining unreacted. I have found that this unreacted acetone, when recovered from one alkali treatment by distillation and when again subjected to the same alkali treatment, is much less reactive than the fresh, previously untreated or virgin acetone. This seems to be largely due to a lower enolic content and it therefore appears that enolic acetone and not ketonic acetone is the actual substance which will combine with itself (condensation reaction) to form such higher boiling derivatives as diacetone alcohol, etc. This is also substantiated by the relative differences in reactivity of commercial acetone derived from various sources.

I have found that certain substances may be added to acetone-alkali reaction mixtures which act as promoters of enolization and which in consequence increase the yields of condensation products and bring about their formation in less time than would otherwise occur. The use of promoters of enolization to displace the usual equilibrium of acetone and its condensation derivatives, with increase of the usual yields of said derivatives, is the primary feature of my invention. Such organic substances as contain a COH group, that is, such materials as tertiary alcohols and the aldehydes, particularly formaldehyde, are especially suitable as promoters. The expression "containing a COH group" is used hereinafter, in that sense. The invention is not restricted to the use of the specific promoters mentioned. The use of specific promoters of enolization in combination with a condensing agent or an alkaline catalyst is of particular value when treating acetone which previously has undergone alkali treatment, or with other acetone of low reactivity towards the usual condensing agents. Without creating any limitation thereby I shall illustrate the invention by the use of alkali metal hydroxides, it being understood that the employment of other condensing agents is not precluded.

In one case to 6250 parts by weight of a good commercial grade of acetone I added 1.875 parts of potassium hydroxide=0.03 per cent. The mixture was agitated for a short while to admix catalyst and allowed to stand at room temperature for 24 hours, then neutralized with tartaric acid and distilled at normal atmospheric pressure. The following fractions were collected:

| | | |
|---|---|---|
| 60–70° C | 330 parts by volume | = 5.3 per cent |
| 70–80° C | 200 parts by volume | = 3.2 per cent |
| 80–100° C | 145 parts by volume | = 2.3 per cent |
| 100–120° C | 60 parts by volume | = 0.95 per cent |
| 120–150° C | 137 parts by volume | = 2.2 per cent |
| 150–160° C | 340 parts by volume | = 5.4 per cent |
| 160–170° C | 327 parts by volume | = 5.4 per cent |
| Total converted | 1549 parts | =24.95 per cent |

When the unreacted acetone, i. e., material boiling under 60° C., was recovered by distillation it was found to be slightly acid so when neutralized and again treated in the same manner for twenty-four hours, almost no conversion was obtained, i. e., less than 1 per cent. When allowed to react for thirty hours a conversion of 10 per cent was obtained, only 1.8 per cent, however, boiling above 100° C. When the alkali concentration was increased to 0.05 per cent and the reaction allowed to proceed at room temperature for forty-two hours, much better results were obtained. For example, to 2800 parts of recovered acetone I added 1.4 parts potassium hydroxide=0.05 per cent and reacted this for forty-two hours before neutralizing and distilling. The following fractions were then obtained:

|  | Parts by volume |
|---|---|
| 60–70° C | 358 |
| 70–80° C | 93 |
| 80–100° C | 82 |
| 100–120° C | 27 |
| 120–150° C | 31 |
| 150–160° C | 127 |
| 160–170° C | 171 |

Total conversion 889 parts=31 per cent.
Products obtained boiling over 100° C.=12.4 per cent.

These results show how less reactive the re-used actetone becomes, requiring much longer time for satisfactory yield.

To 500 parts by weight of acetone which had twice previously been treated with alkali and subsequently recovered, I added one-tenth part by weight=0.02 per cent of potassium hydroxide and 1 part by weight of 40 per cent aqueous formaldehyde (equal to .08% of actual formaldehyde, based on the amount of acetone) and the whole was allowed to stand at room temperature for eighteen hours. It was then neutralized and distilled.

The following fractions were obtained:—

| 60–70° C | 120 parts | Yield 52 per cent by volume= 44 per cent by weight. |
|---|---|---|
| 70–80° C | 25 parts |  |
| 80–100° C | 25 parts |  |
| 100–120° C | 7 parts |  |
| 160–170° C | 40 parts |  |

The foregoing shows that in the presence of aqueous formadehyde as a promoter a much greater yield of condensation product was obtained in eighteen hours, than in forty-two hours without the formaldehyde and with over twice the alkali concentration. It should also be noted that when the same acetone (i. e. that used in this last test) was used with the same amount of caustic potash, and without formaldehyde, and allowed to react for twenty-four hours, practically no conversion was obtained. The marked influence of formaldehyde as a promoter is thus evidenced.

Some other mixtures were made in which 500 parts by weight of such recovered acetone was admixed with 1 part by weight of diacetone alcohol and two one-hundredths of one per cent potassium hydroxide, and in another case to the same amount of acetone and potassium hydroxide 5 parts, by weight, of commercial isopropyl alcohol containing three per cent by weight of tertiary butyl alcohol was added. A blank was also run with no addition of promoter. In the case of the material containing no promoter, no diacetone alcohol was obtained in twenty-four hours, while the material treated with diacetone alcohol and with the isopropyl alcohol containing tertiary butyl alcohol, 12 per cent of diacetone alcohol was formed within sixteen hours, and in both cases from 50 to 60 per cent of the acetone had undergone condensation to derivatives boiling above 60° C.

This shows that certain materials, such as formaldehyde and tertiary alcohols act as promoters for the formation of higher derivatives from acetone, when treated with alkaline catalysts.

In one form of my invention I proceed as follows:—

To 100 parts by weight of acetone maintained approximately at room temperature, that is, from 20–30° C., I may add an amount of alkali metal hydroxide ranging from one-one hundredth of one per cent to approximately one-tenth of one per cent of the ketone employed, usually employing not more than three one-hundredths of one per cent, of say, potassium hydroxide. The alkali may be added in the form of a fine powder and the mixture may be agitated until the alkali is well dispersed. To the mixture I then add a promoter of enolization, such as, for example, aqueous formaldehyde or a tertiary alcohol. A small amount of such promoter usually will suffice, although I do not limit myself to any specific proportion. I have found that from one-fourth of one per cent to five per cent of a promoter such as 40% solution of formaldehyde, is usually effective. After the introduction of said promoter, I allow the mixture to stand for a sufficient length of time and then neutralize the mixture with some acid, such as hydrochloric, sulphuric, tartaric, acetic, etc., whose potassium or sodium salt will be insoluble in the menstruum and hence will settle out, or can be easily filtered from the mixture. The solution is then fractionally distilled under ordinary pressure and the solvents of various boiling points, including diacetone alcohol, collected. The uncondensed acetone is recovered and may be re-used according to the same process, and it is within the purview of my invention to so arrange the several operations as to make practically a continuous process of it. While in my preferred form of the invention, I use specific promoters of enolization in combination with alkali metal hydroxide condensing agents, I may also use various other condensing agents, including calcium and barium hydroxide in combination with a promoter.

In view of the diminished reactivity of acetone which has previously been treated with alkaline or other condensing agents to form higher boiling liquids, with subsequent recovery, and since such recovered acetone is less reactive than fresh, virgin acetone, my invention is found to be of particular value for such acetone of diminished reactivity. In fact, any acetone of low enolic content especially may be profitably treated according to my invention.

What I claim is:—

1. The process for converting acetone into liquids of higher boiling point, which comprises subjecting recovered acetone from a condensation process, to the action of a condensing catalyst and a compound selected from the herein described group consisting of formaldehyde and tertiary alcohols.

2. The process for converting acetone into liquids of higher boiling point, which comprises subjecting recovered acetone from an alkaline condensation process to the action of a caustic alkali as a condensing agent in the presence of a compound promoting alkaline condensation, and selected from the herein described group consisting of formaldehyde and tertiary alcohols.

3. A process as in claim 1, in which the condensing catalyst is a few hundredths of a per cent of an alkali metal hydroxide.

4. The process for converting acetone into liquids of higher boiling point, which comprises subjecting acetone of low enolic content, to the action of a condensing catalyst and formaldehyde.

5. The process for converting acetone into liquids of higher boiling point, which comprises subjecting acetone of low enolic content, to the action of a condensing catalyst in the presence of a tertiary alcohol, added in amount equal to a minor fraction only of the acetone under treatment.

6. In the cyclic process of converting acetone into liquids of higher boiling point, the step which comprises subjecting acetone to the action of a condensing catalyst, adding a substance selected from the herein described group consisting of formaldehyde and a tertiary alcohol and repeating said procedure until a substantial proportion of the acetone has been converted.

7. In the cyclic process of converting acetone into liquids of higher boiling point, the step which comprises subjecting acetone of low enolic content, to the action of a small fraction of a per cent of an alkaline catalyst and a specific promoter of enolization containing a COH group, and in recovering the unconverted acetone, and in repeating said procedure until a substantial portion of the acetone has been converted.

BORIS N. LOUGOVOY.